UNITED STATES PATENT OFFICE 2,680,689

PROCESS FOR THE MANUFACTURE OF BAKER'S YEAST

Karl Schneider, Mannheim, Germany, assignor to Backhefe G. m. b. H., Frankfurt am Main, Germany, a firm No Drawing. Application December 5, 1950, Serial No. 199,367

4 Claims. (Cl. 99—96)

The present invention is concerned with a process for the culture of fermentation organisms, especially yeasts, according to the aerobic method and with employment of usual sugar-containing substrates and nutrient salts.

It is known that fermentation organisms, especially yeasts, are forced to multiply if they are cultured under conditions of overfeeding. For such over-feeding conditions high value cereals and substrate substances which are rich in growth-promoting material or in nitrogen are used. This overfeeding normally takes place at the commencement of the production process. The further course of the production generally takes place with the use of molasses and nutrient salts. In the manufacture it is usual to endeavour so far as possible, to guide the cultivation stages uniformly, wherein the essential difference in the operations consists in the main in the different course of the pH in the wort. The concentration of the nutrient substrate may oscillate within varying degrees. In general a sugar concentration of from 2.5 to 5% would be present at the end of the fermentation process, if the fermentation induced by the addition were not to consume this. The feeding of the yeast proceeds uniformly, and not only covers the nutrient requirement, but exceeds it. The fermentation temperature is generally from 24–30° C. It is also known that the fermentation temperatures may lie between 14 and 35° C., and that a transient reduced supply of nourishment or reduction in the fermentation temperature causes a fermentation delay.

According to the invention the influence on the growth of the organisms present in the cultivation stage is effected by alternate hindering and accelerating measures, carried out in such a manner that after this treatment they have an increased power of fermentation and multiplication.

Among other hindering measures which may be used either singly or in combination, reference may be made to the use of difficultly fermentable substrates, such, for example, as cane-molasses, refinery-molasses and the like, which hinder fermentation, or the addition of substrates poor in or free from growth- and activity-promoting substrates, such, for example, as residues from alcohol or yeast manufacture, wood sugar, sulphite lyes, alcoholic worts and the like. But a reduced addition of normal nutrient substrate also acts as a hindering measure. The hindrance is increased if the growth of the fermentation organisms is impaired by the use of poisons, such, for example, as formalin or sulphurous acid or if unusually high hydrogen ion concentrations are employed during the fermentation.

These substrates or poisons which in hitherto known processes have been little liked and in part feared, are, according to the invention, used as an important influencing element. If one uses substrates which have a high content of fermentation products produced by the fermentation organisms, such, for example, as a high alcohol concentration from yeast production, or if one raises the carbon dioxide pressure, then an especially powerful influencing of the fermentation organisms in the sense of a loading or hindrance occurs. A milder hindrance occurs if the amount of air, i. e. the supply of oxygen is reduced, as well as if the supply of nitrogen is restricted. Other hindering measures which come into question are the supply of substrates whilst withholding additions of nitrogen or a lower than normal supply of phosphates.

Whilst in previously used processes it has been the custom to operate at pH values of from 4.0–7 in the wort, a temporary reduction to about 2.5 to 4 takes place according to the invention. This is done by the addition of acid or by the generation of acid from the added ammonium salts.

Another hindering measure of importance resides in the employment of abnormally low fermentation temperatures, which contrary to temperatures hitherto used are—in the hindering stage according to the invention restricted to about 10 to 22° C.; and thus no longer oscillate between 14 and 35° C.

As acceleration measures in the sense of the present invention the return to normal conditions may in the first place be understood, but also a surpassing of these conditions. To such conditions there belong, for example the use of especially bio-rich extracts or other bio-rich substances.

According to the invention the hindering and accelerating measures may be applied for short and/or longer periods of time, it being advisable to apply the powerfully acting poisons and the like for as short a time as possible, and—as it were—shockwise and if desired repeatedly. It may be advantageous to pursue the hindering and accelerating measures up to the limit of capacity for life of the organisms, which may especially apply to the use of yeast poisons and to high acid concentrations.

The hindering and accelerating measures may be introduced at the beginning or at the later stage of the production and they may, for example consist of overfeeding at the beginning of the culture or of temporary under-nourishment.

The advantages of the present process as against known processes are based on the fact that the anomalies which are intentionally introduced into the production procedure have the effect of favouring the yield. The are also based on the fact that difficultly fermentable substrates, such as wood-sugar, cane-molasses and the like can be utilized for the production of high quality yeast in greater admixture or in greater quantity than heretofore. These advantages can be further increased if the measures according to the invention alternate after short intervals of time, i. e. if both shock-like irritations as also prolonged effects are undertaken and care is taken to ensure recovery at the right time.

The main effects of the measures according to the invention are in the production of yeast in addition to a lightening of the colour of the end product, above all an improvement in durability and a greater power of resistance to high temperatures, especially in summer. Further the activity, and the maintenance of activity of yeasts is materially increased. However, of especial importance is a material increase in the yield, which for example over an experimental period of a complete month was 10% higher than when employing usual processes.

If the hindering and accelerating measures are suitably varied the activity, the maintenance of activity and an improvement in oven-activity can be combined with an increased yield. But the main attention can also be directed to the individual properties as for example increase of yield, increase of oven activity and increase of durability.

The actual interval of the hindering measures may depend on the nature of the starting materials employed.

The carrying out of the process according to the invention will be further explained with the aid of several examples, without a restriction of the invention to the experimental and temperature conditions, quantities and the like employed being intended.

Examples

*Example 1.*—1200 kg. of setting yeast are treated with 4500 kg. of molasses in the following manner: At the beginning of the fermentation 600 kg. molasses and 60 kg. ammonium sulphate are added. The pH is adjusted to 4.0 with acid. The feed of the molasses to begin with takes place in hourly diminishing quantities, so that hourly 300 or 250 kg. of molasses are run in. Then a larger addition of 1000 kg. molasses is made, after which the quantities are again diminished until they fall to 100 kg. per hour. The extract of 250 kg. superphosphate serves as a phosphate addition. The addition of 300–400 kg. of ammonium sulphate proceeds in a manner analogous to that of the supply of the molasses. The aeration is maintained so strong that at the end of the fermentation there is no alcohol in the wort. The pH of the wort falls from 4.0 during a period of 6–8 hours to 2.8 to rise again at the end to 3.5. If necessary acid must be added. The temperature of the fermentation varies between 24–30° C. The yeast is separated from the alcoholless liquid. Including the setting yeast, 5300 kg. are obtained. With this quantity of yeast as seeding yeast, the following fermentation is performed: 1200 kg. of molasses are used. The fermentation starts at 12° C. with an addition of 650 kg. molasses and with weak aeration, and is continued at a temperature rising slowly to 21° C. and whilst maintaining weak aeration. During this period neither nitrogen nor phosphate are added. 400–600 kg. of molasses are added per hour. After a temperature of 20–21° C. is reached, the normal fermentation temperature of 26–30° C. is reached in a short time, if necessary with artificial heating. The molasses feed is then raised to 1100 to 1400 kg. per hour. The ammonium salt addition amounts to 60–90 kg. and the phosphate addition to 11 to 16 kg. $P_2O_5$ per hour. The aeration is so strong that at the end of the fermentation the wort is free from alcohol. A total of 16,000 kg. yeast are obtained.

*Example 2.*—Yeast is cultured in the laboratory on cane-molasses, and for the purpose of pure culture is introduced into malt wort of molasses, which contains an addition of malt germ extract. The alcohol producing treatment which follows is carried out at a temperature of 15–22° C. With the yeast (about 350 kg.) thereby obtained either 3000 kg. cane-molasses or 4000 kg. wood sugar molasses of 40% sugar content are fermented with weak aeration and strong carbon dioxide generation at 30–35° C. for a short time (4–7 hours) with the addition of 50 kg. ammonium sulphate and of the extract of 40 kg. superphosphate. At the end of the fermentation the alcohol content of the wort is 3%. 1000 kg. yeast are obtained. The further yeast production takes place according to the two last phases, as described in Example 1 and with the employment of altogether 3000 kg. beet-molasses. The yield, calculated on the whole of the material, amounts to 61% yeast and 12.6% alcohol.

*Example 3.*—Yeast is cultured on cane-molasses in the laboratory and, for the purpose of pure culture is introduced into malt wort or molasses containing an addition of malt germ extract. The succeeding alcohol producing treatment is carried out at a temperature of 15–22° C. With the yeast thus obtained (about 350 kg.) 3000 kg. of beet molasses, without addition of ammonium sulphate are fermented for a short time with weak aeration at 30–35° C. and with the addition of the extract of 40 kg. superphosphate. 1000 kg. of yeast are obtained. The nitrogen content of this yeast is reduced materially e. g. to 5.5% by interrupting the addition of nitrogen and phosphate and with 300 kg. molasses and strong aeration during 4–5 hours. Thereupon fermentations according to the two last phases, as in Example 1 follow on.

*Example 4.*—300 kg. of setting yeast are strongly aerated with 100 kg. molasses in a dilution of 1:10 to 1:15, without addition of nitrogen and phosphate at a pH of 2.5–3.0 and at 24° C. Thereupon the liquid is diluted and the pH is very quickly raised to 4.0. Then follow the two-stage fermentations according to Example 1 by fermenting 1500 kg. of molasses and 5000 kg. of molasses, respectively. 5000 kg. of yeast are obtained.

Instead of using a high acid concentration of a pH of 2.5 to 3.0 as a hindering measure for treating the setting yeast, formalin concentration of 0.5–1.0% at a pH of 3.5 to 4.0 can be introduced.

What I claim is:

1. A process for the production of baker's yeast in a multiple stage process including production of seed yeast and commercial yeast on a yeast nutrient medium under aeration in order to obtain a high yield, comprising producing seeding yeast without production of alcohol at a pH in a range from 2.5 to 4.0 in order to produce a forced seed yeast, removing said seed yeast from the liquor, then producing commercial yeast by subjecting said yeast to hindering fermentation in order to cause a higher multiplication of said yeast by adding during said fermentation small slowly increasing quantities of molasses as a yeast nutrient medium with very weak aeration beginning at a temperature of 12° C. and gradually increasing the temperature up to 21° C., and thereafter accelerating the fermentation on the yeast nutrient medium by adding large quantities of molasses, nitrogen and phosphate and with strong aeration in order to obtain a high yield of yeast.

2. A process for the production of baker's yeast in a multiple stage process including production of seed yeast and commercial yeast on a yeast nutrient medium under aeration in order to obtain a high yield, comprising producing seeding yeast without production of alcohol at a pH in a range from 2.5 to 4.0 in order to preserve a forced seed yeast, removing said yeast from the liquor, then producing commercial yeast by subjecting said yeast to hindering fermentation in order to cause a high multiplication of said yeast by adding during said fermentation small slowly increasing quantities of molasses as a yeast nutrient medium in the absence of added nitrogen and phosphate with very weak aeration beginning at a temperature of 12° C. and gradually increasing the temperature up to 21° C., and thereafter accelerating the fermentation on the yeast nutrient medium by adding large quantities of molasses, nitrogen and phosphate and with strong aeration in order to obtain a high yield of yeast.

3. A process for the production of baker's yeast in a multiple stage process including production of seed yeast and commercial yeast on a yeast nutrient medium under aeration, in order to obtain a high possible yield, comprising producing seeding yeast without production of alcohol by treating said yeast with added sugar containing substrates under strong aeration at a pH ranging from 2.5 to 3.0 in the absence of added nitrogen and phosphate and continuing the fermentation at a pH in a range from 2.5 to 4.0 in order to produce a forced seed yeast, removing said yeast from the liquor, then producing commercial yeast by subjecting said yeast to hindering fermentation in order to cause a higher multiplication of said yeast by adding during said fermentation small slowly increasing quantities of molasses as a yeast nutrient medium in the absence of added nitrogen and phosphate with very weak aeration beginning at a temperature of 12° C. and gradually increasing the temperature up to 21° C., and thereafter accelerating the fermentation in the yeast nutrient medium by adding large quantities of molasses, nitrogen and phosphate and with strong aeration in order to obtain a high yield of yeast.

4. A process for the production of baker's yeast in a multiple stage process including production of seed yeast and commercial yeast on a yeast nutrient medium under aeration, in order to obtain a high yield, comprising producing seeding yeast without production of alcohol by treating said yeast with substances adversely affecting the growth of yeast under strong aeration at a pH ranging from 3.5 to 4.0 and continuing the fermentation at a pH ranging from 2.5 to 4.0 in order to produce a forced seed yeast, removing said yeast from the liquor, then producing commercial yeast by subjecting said yeast to hindering fermentation in order to cause a higher multiplication of said yeast by adding a small slowly increasing quantity of molasses as a yeast nutrient medium in the absence of added nitrogen and phosphate with very weak aeration beginning at a temperature of 12° C. and gradually increasing the temperature up to 21° C., and thereafter accelerating the fermentation on the yeast nutrient medium by adding large quantities of molasses, nitrogen and phosphate and with strong aeration in order to obtain a high yield of yeast.

References Cited in the file of this patent

UNITED STATES PATENTS

| Number | Name | Date |
|---|---|---|
| 1,722,803 | Klein | July 30, 1929 |
| 1,767,646 | Bratton | June 24, 1930 |
| 1,774,546 | Claassen | Sept. 2, 1930 |
| 1,910,265 | Shaver et al. | May 23, 1933 |
| 1,920,395 | Jellinek | Aug. 1, 1933 |
| 2,013,456 | Braasch et al. | Sept. 3, 1935 |
| 2,059,980 | Bennett | Nov. 3, 1936 |
| 2,079,634 | Schultz | May 11, 1937 |
| 2,183,570 | Irvin et al. | Dec. 19, 1939 |
| 2,304,471 | Meyer et al. | Dec. 8, 1942 |
| 2,367,931 | Deloffre | Jan. 23, 1945 |

FOREIGN PATENTS

| Number | Country | Date |
|---|---|---|
| 390,114 | Great Britain | of 1932 |